US010200206B2

(12) United States Patent
Wallbaum et al.

(10) Patent No.: US 10,200,206 B2
(45) Date of Patent: Feb. 5, 2019

(54) METHOD AND SYSTEM FOR CONTEXTUALIZING AND TARGETING INQUIRIES IN REMOTE MEETINGS

(71) Applicant: FUJI XEROX CO., LTD., Tokyo (JP)

(72) Inventors: Torben Wallbaum, Hamburg (DE); Andreas Girgensohn, Palo Alto, CA (US); Lynn Donelle Wilcox, Redwood City, CA (US); Frank M. Shipman, III, College Station, TX (US); Susanne Boll-Westermann, Oldenburg (DE)

(73) Assignee: FUJI XEROX CO., LTD., Tokyo (JP)

( * ) Notice: Subject to any disclaimer, the term of this patent is extended or adjusted under 35 U.S.C. 154(b) by 342 days.

(21) Appl. No.: 15/067,582

(22) Filed: Mar. 11, 2016

(65) Prior Publication Data

US 2017/0264447 A1 Sep. 14, 2017

(51) Int. Cl.
*G06F 15/16* (2006.01)
*H04L 12/18* (2006.01)

(52) U.S. Cl.
CPC .............................. *H04L 12/1822* (2013.01)

(58) Field of Classification Search
CPC .................................................. H04L 12/1822
USPC ....................................................... 709/219
See application file for complete search history.

(56) References Cited

U.S. PATENT DOCUMENTS

| 6,760,749 B1* | 7/2004 | Dunlap | H04N 7/147 348/14.08 |
| 8,635,293 B2* | 1/2014 | Fisher | G06Q 10/107 709/204 |
| 2007/0067104 A1* | 3/2007 | Mays | G01C 21/36 701/437 |
| 2014/0047335 A1* | 2/2014 | Lewis | G06F 3/0484 715/716 |

OTHER PUBLICATIONS

Barksdale, J. T., et al., Video Threads: Asynchronous Video Sharing for Temporally Distributed Teams, CSCW'12, Feb. 11-15, 2012, Seattle Washington, 4 pgs.
Girgensohn, A., et al., HyperMeeting: Supporting Asynchronous Meetings with Hypervideo, MM'15, Oct. 26-30, 2015, Brisbane Australia, 10 pgs.
Tang, J. C., et al., Time Travel Proxy: Using Lightweight Video Recordings to Create Asynchronous, Interactive Meetings, CHI'12, May 5-10, 2012, Austin Texas, 10 pgs.

* cited by examiner

*Primary Examiner* — Krisna Lim
(74) *Attorney, Agent, or Firm* — Procopio, Cory, Hargreaves & Savitch LLP

(57) ABSTRACT

A method of requesting an inquiry reply during a synchronous remote meeting is provided. The method includes recording a synchronous meeting between remote users to generate a meeting recording, generating an inquiry during the synchronous meeting to create a generated inquiry, identifying a portion of the meeting recording relevant to the inquiry during the synchronous meeting, and transmitting the generated inquiry and the captured portion of the recording to a recipient user.

20 Claims, 10 Drawing Sheets

METHOD AND SYSTEM FOR CONTEXTUALIZING AND TARGETING INQUIRIES IN REMOTE MEETINGS

BACKGROUND

Field

The present disclosure relates to remote asynchronous meeting systems, and more specifically, to generating inquiries in remote synchronous meetings.

Related Art

Meetings can be an important part of collaborative activities but may be difficult to schedule, particularly when collaborators are spread across multiple locations and multiple time zones. Related art systems may allow for remotely located collaborators to synchronously attend meetings by transmitting audio, video, and/or other shared data between collaborators in real-time. The related art systems may also allow the audio, video, and/or other shared data to be recorded and/or stored for later review by collaborators, who may or may not have attended the meeting synchronously.

Further, meetings may often include overlapping content such that the stored audio, video, or other shared data of previous meetings may be reviewed during subsequent meetings using related art systems. However, even with related art systems, collaborators may not be able to attend every meeting and some collaborators present at one meeting may be absent from a subsequent meeting. Even though a collaborator is absent, the attending collaborators may need to ask the missing collaborator for information related to the meeting discussion (e.g., performance information, sales information, etc.) or assign the missing collaborator a follow-up inquiry (e.g., update code, fix a problem, circulate documents, etc.) during the meeting. Some of the related art systems require the attending collaborators to provide out a lengthy text description of the needed information or assigned project, to provide the absent collaborator with context for the request. Other related art systems require the absent collaborator to review an entire recording of the meeting to understand the context associated with the assigned information request or project.

SUMMARY

Aspects of the present application may include a method of requesting an inquiry reply during a synchronous remote meeting. The method includes recording a synchronous meeting between remote users to generate a meeting recording, generating an inquiry during the synchronous meeting to create a generated inquiry, identifying a portion of the meeting recording relevant to the inquiry, and transmitting the generated inquiry and the captured portion of the recording to a recipient user.

Further aspects of the present application may include a non-transitory computer readable medium having stored therein a program for making a computer execute a method of requesting an inquiry reply during a synchronous remote meeting. The method includes recording a synchronous meeting between remote users to generate a meeting recording, generating an inquiry during the synchronous meeting to create a generated inquiry, identifying a portion of the meeting recording relevant to the inquiry, and transmitting the generated inquiry and the captured portion of the recording to a recipient user.

Additional aspects of the present application may include a server apparatus configured to request an inquiry reply during a synchronous remote meeting. The server apparatus includes a memory and a processor. The processor is configured to record a synchronous meeting between remote users to generate a meeting recording, generate an inquiry during the synchronous meeting to create a generated inquiry, identify a portion of the meeting recording relevant to the inquiry, and transmit the generated inquiry and the captured portion of the recording to a recipient user.

Still further aspects of the present application may include a server apparatus configured to request an inquiry reply during a synchronous remote meeting. The server apparatus includes means for recording a synchronous meeting between remote users to generate a meeting recording, means for generating an inquiry during the synchronous meeting to create a generated inquiry, means for identifying a portion of the meeting recording relevant to the inquiry, and means for transmitting the generated inquiry and the captured portion of the recording to a recipient user.

BRIEF DESCRIPTION OF THE DRAWINGS

Exemplary embodiment(s) of the present invention will be described in detail based on the following figures, wherein.

DETAILED DESCRIPTION

Figure 1:
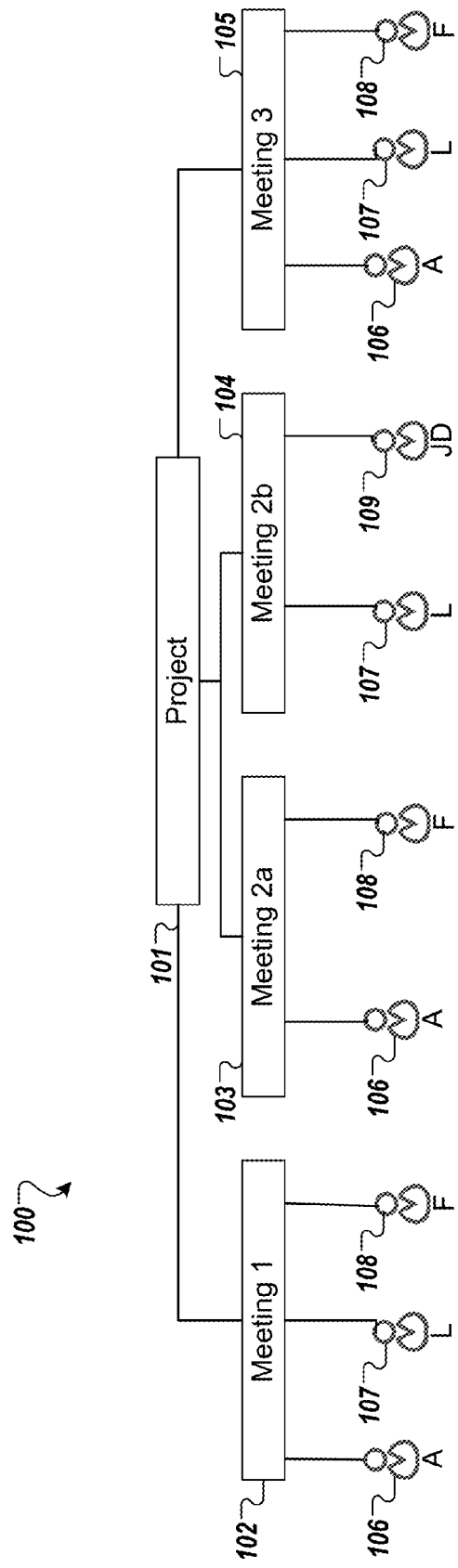
FIG. 1 illustrates an example of a meeting structure, which may use a system according to an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Providing an option for collaborators attending remote synchronous meetings to generate an inquiry and to identify portions of a recording of the remote synchronous meeting relevant to the inquiry, may allow the inquiry to be sent to the absent collaborator with copies or links to the relevant portions of the recordings. Further, providing the missing collaborator with an option to respond with a recording may allow the reply recording to be incorporated, inserted, appended, or linked to the recording of the meeting for later viewing.

FIG. 1 illustrates an example of a meeting structure 100, which may use a system according to an example implementation of the present application. As illustrated, the meeting structure may include a project 101 including periodic project meetings (e.g., "Meeting 1" 102, "Meeting 2a" 103, "Meeting 2b" 104, and "Meeting 3" 105) involving a distributed team. Collaborator A 106 and Collaborator L 107 are in a first location and Collaborator F 108 is in a second, different location for Meeting 1 102. As such, a remote meeting system, or remote meeting software (e.g., a non-transitory computer readable medium having stored therein a program) installed on a computing device, may be used to allow the Collaborators A 106, L 107, and F 108 to attend meetings synchronously even though located at different locations.

Collaborators A 106, L 107, and F 108 may usually be necessary at each meeting, but they each may have other projects/responsibilities and may not always be available for every scheduled meeting. Further, other collaborators (e.g., Collaborator JD 109) may also attend meetings periodically.

As shown in FIG. 1, a kickoff meeting (Meeting 1, designated by numeral 102 in FIG. 1) occurs with Collaborators A 106, L 107, and F 108 each recorded in their own recording device (e.g., a video camera or video recording device, or audio recording device), each recording device recording his or her own contributions. In some example implementations, Collaborators A 106 and L 107 may share a recording device. Later, Collaborator L 107 may not be available at the normal meeting time, but Collaborators A 106 and F 108 may meet (meeting 2a, designated by numeral 103 in FIG. 1) to discuss progress in separate locations using their separate recording devices. In some example implementations, Collaborators A 106 and F 108 may review the recordings from prior meetings (e.g., "Meeting 1" 102), for example, to make sure they remember Collaborator L's 107 perspective on some of the issues during the subsequent meeting (e.g., "Meeting 2a" 103 in FIG. 1).

Figure 2:
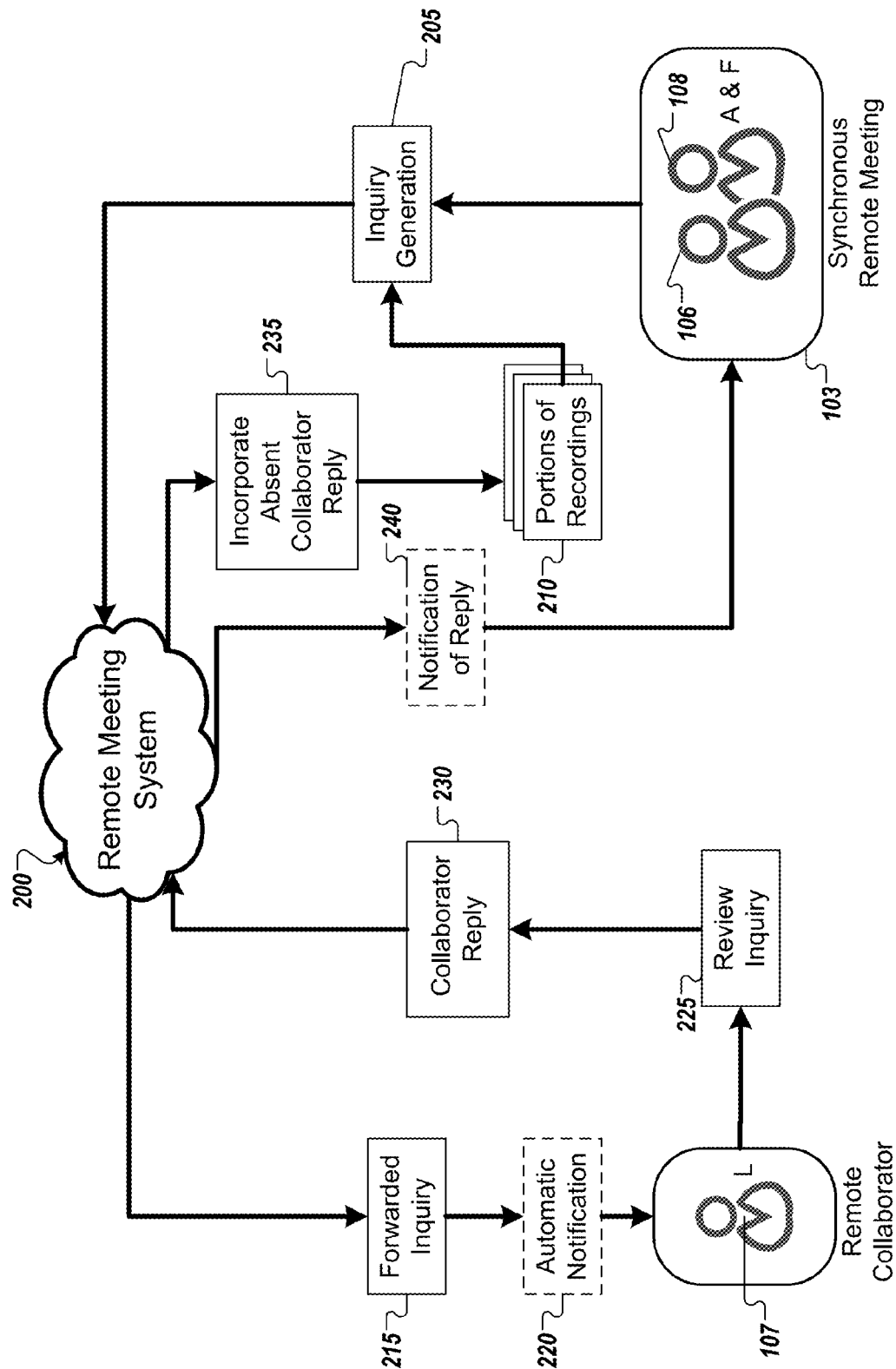
FIG. 2 is a schematic diagram of generating an inquiry during a meeting using a system according to an example implementation of the present application.

During Meeting 2a 103, Collaborators A 106 and F 108 may also generate an inquiry asking Collaborator L 107 (who is not in the meeting) a question, or assigning Collaborator L 107 a project, and send the inquiry to Collaborator L 107. When generating the inquiry, Collaborators A 106 and F 108 may identify portions, or links to portions, of a recording of the current meeting (e.g., Meeting 2a 103), which provide context to the inquiry. Once the inquiry has been generated, the inquiry and the identified recording portions, or links to portions of the recording, are sent to Collaborator L 107. FIG. 2 discussed below illustrates inquiry generation during a meeting in greater detail.

Later, Collaborator L 107 may meet with Collaborator JD 109 to further discuss the project in a separate meeting (e.g., "Meeting 2b" 104 in FIG. 1). In some example implementations, Meeting 2b 104 between Collaborator L 107 and Collaborator JD 109 may relate to reactions or responses to the inquiry that was generated during the Meeting 2a 103 between Collaborators A 106 and F 108, but may also include other topics as well. During Meeting 2b 104, Collaborator L 107 and Collaborator JD 109 may review the portions of the recordings, or links to portions of the recordings, generated during Meeting 2a 103, while also generating new recordings of their meeting (Meeting 2b 104).

Later, the next regularly scheduled distributed meeting (e.g., "Meeting 3" 105 in FIG. 1) is held with Collaborators A 106, L 107, and F 108 all attending from one or more different locations. Collaborators A 106, L 107, and F 108 may review recordings from one or more of the previous meetings (e.g., Meeting 1 102, Meeting 2a 103, and Meeting 2b 104) as questions arise during Meeting 3 105.

FIG. 2 is a schematic diagram of generating an inquiry during a meeting using a system 200 according to an example implementation. The generating an inquiry illustrated in FIG. 2 may occur during a synchronous remote meeting (e.g., Meeting 2a 103 from FIG. 1) between remotely located system users or collaborators (e.g., Collaborators A 106 and F 108 from FIG. 1) and another user or collaborator (e.g., Collaborator L 107 from FIG. 1). While having a synchronous meeting (e.g., Meeting 2a 103), participants (e.g., Collaborators A 106 and F 108) generate an inquiry to be sent to an absent collaborator (e.g., Collaborator L 107) at 205.

When generating the inquiry at 205, either Collaborator A 106 or Collaborator F 108 may draft a question, description of a point of action, or other desired inquiry information to which Collaborator L 107 is being asked to reply. Additionally, either Collaborator A 106 or Collaborator F 108 can select portions of past meeting recordings (e.g., audio or video recordings) or recordings of the present meeting to be included with the inquiry at 210. The selecting of portions of the recordings is discussed in greater detail below with respect to FIG. 3.

The inquiry information and portions of the recordings may provide additional contextual information to help the Collaborator L 107 to understand the inquiry better. In some example implementations, system 200 may automatically create new, smaller recording files (e.g., audio or video recordings) to allow review of the recordings on a mobile client or device. In other example implementations, the system 200 may automatically create hyperlinks or other links to allow Collaborator L 107 to jump to specific portions of a larger recording.

A inquiry transmitting unit of the system 200 may then forward the inquiry (and the associated recordings) to Collaborator L 107, or may place the inquiry in a queue for review by Collaborator L 107 at 215. Optionally, in some example implementations, the system 200 may automatically create and send a notification at 220 to make collaborator 107 aware of the assignment of the new inquiry. For example, the system 200 may send an email, a Short Message Service (SMS) message, a mobile application (App) based notification or any other type of notification that may be apparent to a person of ordinary skill in the art. In other example implementations, no notification may be sent to Collaborator L 107, other than the forwarded inquiry being placed in Collaborator L's 107 queue.

After receiving the forwarded inquiry, Collaborator L 107 can review the inquiry and the associated portions of the recordings at 225. In some example implementations, collaborator L 107 may use links attached to the inquiry to stream the portions of the recordings associated with the inquiry. The portions of recordings may be streamed by a backend platform associated with the system. In other example implementations, collaborator L 107 may download the portions of the recording to his or her device for review.

After reviewing the forwarded inquiry, collaborator L 107 can send a reply back to the remote meeting system 200 at 230. In some example implementations, collaborator L 107 may use the remote meeting system 200 to record a reply to the inquiry. In other example implementations, the reply may be a text based reply sent directly to the collaborator generating the inquiry. The text reply may include an email, SMS message, or any other type of communication that may be apparent to a person of ordinary skill in the art. The replying by an absent collaborator (e.g., collaborator L 107) is discussed in greater detail below with respect to FIG. 3.

Once the system 200 receives the reply, the reply may be incorporated at 235 into the recordings from 210 to form a contiguous recording that permits the inquiry and the reply to be reviewed together (e.g., simultaneously, or sequentially based on a user preference). The incorporation of the reply at 230 is discussed in greater detail below with respect to FIG. 3.

Further, in some example implementations, the system 200 may also send a notification at 240 to Collaborators A 106 and F 108 to inform them that the reply has been received and incorporated into the recordings. For example, the system 200 may send an email, an SMS message, an App-based notification, or any other type of notification that may be apparent to a person of ordinary skill in the art. In other example implementations, no notification may be sent by the system 200. If the reply is received before the end of the meeting where the inquiry was generated, the meeting UI may alert the meeting participants and make the reply available for viewing.

Figure 3:
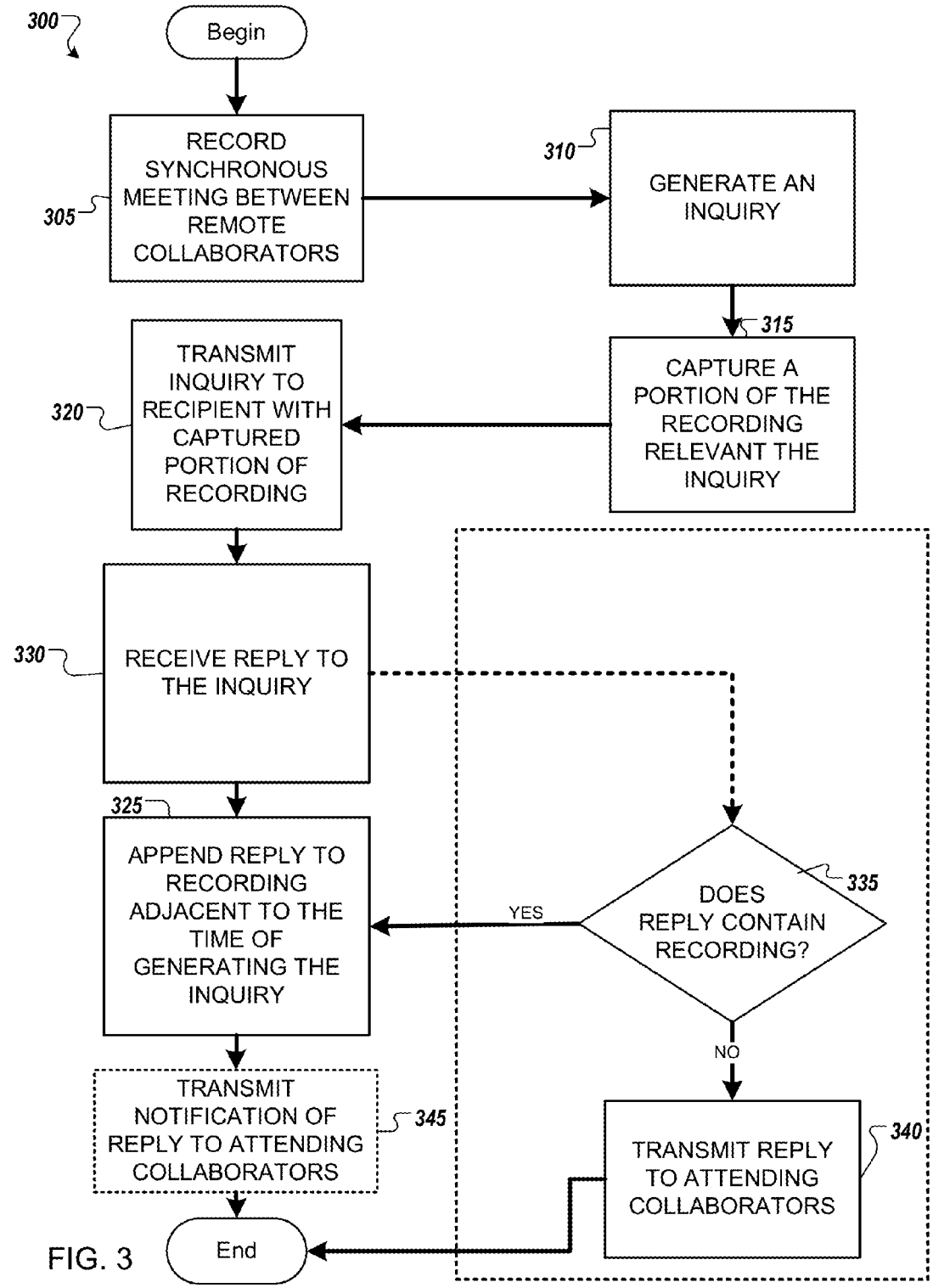
FIG. 3 illustrates a flowchart of a process for sending inquiries and receiving replies according to an example implementation of the present application.

FIG. 3 illustrates a flowchart of a process 300 for sending inquiries and receiving replies according to an example implementation of the present application. The process 300 may be performed by a remote meeting system (e.g., a stand-alone synchronous meeting system, a computing device running synchronous meeting software) according to an example implementation of the present application based on input from collaborators attending a meeting. In the process 300, a synchronous meeting between remote collaborators is recorded in 305. The recording may be done by any recording mechanism that may be apparent to a person of ordinary skill in the art. For example, web cameras, digital cameras, telepresence cameras or any other visual capture devices apparent to a person of ordinary skill in the art could be used to record video or other visual data of the remotely located collaborators during the meeting in some example embodiments. In some example implementations, audio from each of the remote collaborators may be captured using computer microphones, digital voice recorders, smart phones, telephones, or any other audio capture device that could be apparent to a person of ordinary skill in the art.

In some example implementations, the synchronous meeting may also involve reviewing a recorded meeting or chain of recorded meetings by reviewing recording (e.g., audio recording, video recording, etc.) portions or hyperlinks for navigating within a larger recording file. Natural viewing behavior, such as pausing recordings, may automatically generate new portions or hyperlinks between previous and current meetings. A recording of the prior meeting recordings reviewed may also be captured during the meeting to allow an absent collaborator to determine what prior meeting portions were reviewed during a missed meeting.

While the synchronous meeting is in progress, an inquiry may be generated at 310 in response to input from a collaborator attending the current meeting. Examples of inquiries may include, but are not limited to, information requests, including answering requested technical questions about software being developed, asking for data on sales or performance, or requesting the status of a fix to a software bug. Other examples of inquiries may be apparent to a person of ordinary skill in the art.

Generating the inquiry may include determining a recipient for the inquiry, which may be done manually by the requesting collaborator in some example implementations. In other example implementations, the inquiry may be automatically addressed, or an addressee may be automatically suggested by the system. The suggestions may be made based on information about collaborators that have previously attended meetings but may be absent from a current meeting, as discussed below with respect to FIG. 4.

Figure 5:
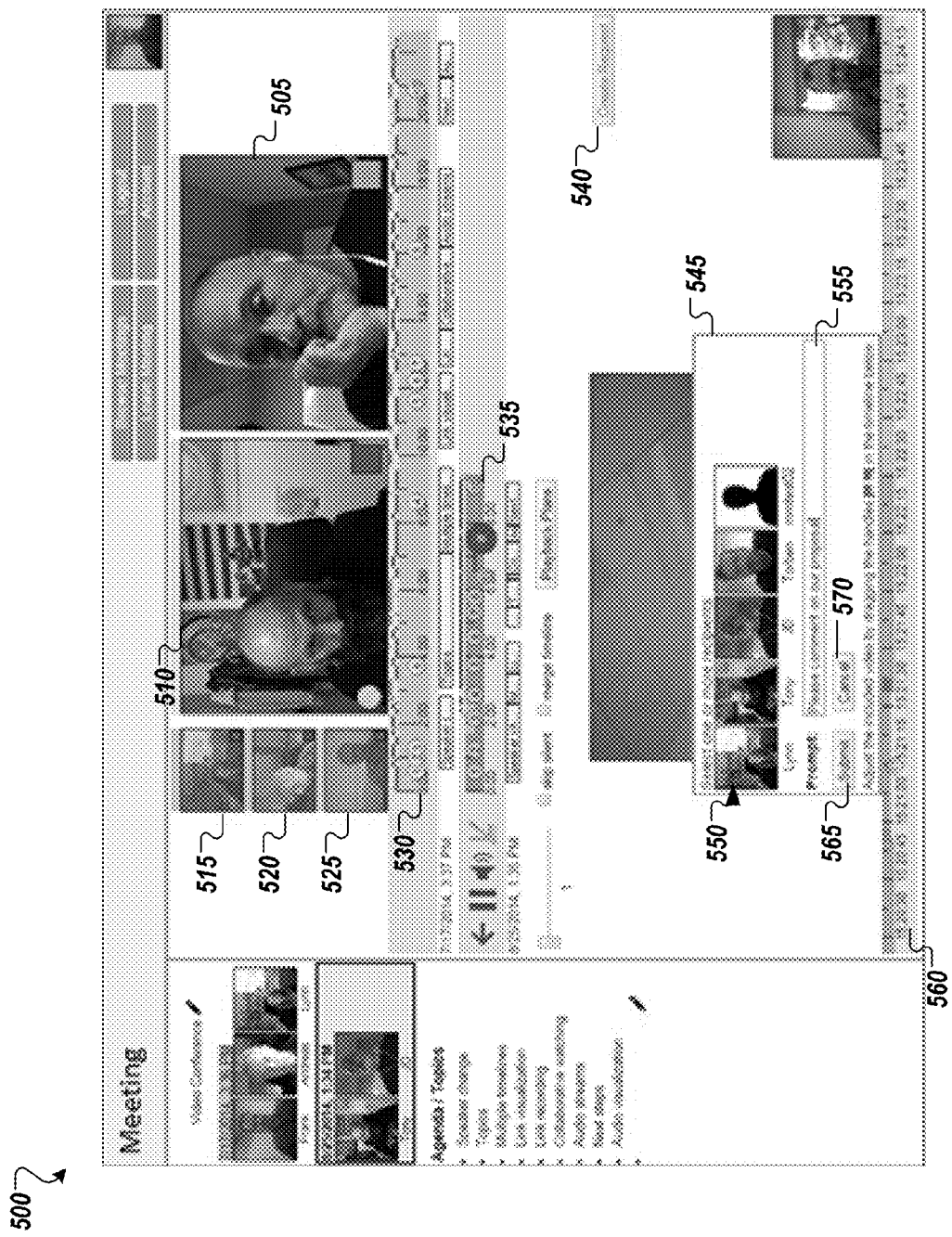
FIG. 5 illustrates an example implementation of a User Interface (UI) usable in one or more processes according to an example implementation of the present application.

In some example implementations, a User Interface (UI), such as the UI 500 illustrated in FIG. 5, may be used to generate the inquiry. The UI 500 of FIG. 5 to generate the inquiry is discussed in greater detail below.

After the inquiry has been generated, a portion of the recordings relevant to the inquiry is captured in 315. In some example implementations, the capturing the portions of the recording may include the system automatically identifying a duration of the recordings to be included as the portion of the recording based on detection of various factors, such as a topic change, a speaker change, a break (e.g., silence) in sentences or changes in recordings being reviewed during the meeting, which occurred prior to the generation of the inquiry in 310.

For example, the system may detect and use information about topic or speaker changes occurring during a period of time (e.g., a few seconds, a few minutes, etc.) before the inquiry was generated in 310. In such an example implementations, the detected topic or speaker change may be used to identify the beginning of the portion of recording to be captured and the end of the portion may be the generation of the inquiry in 310 (e.g., the captured portion may be the portion of recording occurring between the identified topic or speaker change and the generation of the inquiry in 310).

Topic changes during a meeting may be detected using audio or video recognition techniques to determine subject matter being discussed during the meeting and when the subject matter being discussed has changed (e.g., speech to text recognition and pattern recognition algorithms may be used to detect subject matter changes). Speaker changes may also be detected using audio or video recognition to identify which collaborator in a meeting is speaking and when the speaker has changed (e.g., facial recognition or voice recognition algorithms may be used to detect speaker changes).

In another example implementation, the system may detect previous recordings or hyperlinks being reviewed during the meeting and determine a starting point for a portion of the recording to be captured based on a change in the previous recordings or hyperlinks being reviewed. In such an example, when the collaborators begin reviewing a new recording or hyperlink from a previous meeting, the start of the review may be considered the starting point for a portion of the recording to be captured, with the end point of the portion being determined when the inquiry is generated.

In any of the above discussed examples, the system may generate a default segment based on the detection of information (e.g., topic change, speaker change, break in sentences, previous recording change, or hyperlink change) and provide a UI to allow the collaborators attending the meeting to increase or decrease the duration of the portion of recording to be captured. The UI 500 illustrated in FIG. 5 and discussed below could be used to adjust the duration of the portion of recording.

In some example implementations, the default end of the captured portion may be time of the inquiry being generated. However, the default end could also be a different end point. For example, the default end could be a predefined amount of time prior to the inquiry being generated (e.g., 15 seconds prior to the inquiry).

In some example implementations, the system may have a defined hierarchy used to prioritize which type of information should be used to determine a starting point for the portion of recording to be captured. For example, if the meeting is the first meeting in a series of meetings or is not part of a series of meetings, and thus no previous recordings or hyperlinks are being reviewed during the meeting, the previous recordings or hyperlinks may not be considered. In that case, topic changes associated with the meeting may be considered first. For example, if a new topic was started shortly before the creation of the request (e.g., during the last 60 seconds), the topic start is used as the default start of the recording included in the request. Otherwise, the start time may be set to the earliest speaker change during that time (e.g., during the last 60 seconds). If the same speaker has spoken for a long time, pauses in the audio indicating sentence breaks may be used to identify a starting point for a portion of the recording to be captured. Again, the system may provide a UI to allow the collaborators attending the meeting to increase or decrease the duration of the portion of recording to be captured. The UI illustrated in FIG. 5 and discussed below could be used to determine the duration of the portion of recording to be increased or decreased.

Conversely, in another example implementation, if the current meeting is part of a series of meetings and recordings, or hyperlinks from previous meetings, are reviewed during the current meeting, the recordings or hyperlinks reviewed may considered first for selecting the portion of recording. The system may then set the start time to the beginning of the most recent recording or hyperlink reviewed. The system may include the start of the source recording or hyperlink being reviewed in the portion of recording captured. If there is no hyperlink, or if the start of the source recording is too far in the past, the strategies described above may be used (e.g., topic changes, speaker changes, sentence breaks, etc.) to determine a duration of the portion of the recording captured.

Once the start and end points of the portion of the recording have been identified, the portion of the recording may be extracted to send to the intended collaborator as discussed below in some example implementations. In other example implementations, hyperlinks or flags identifying the start and end points of the portion of the recording may be embedded in the larger recording for use in identifying the portion of the recording for the intended collaborator receiving the inquiry.

After the portion of the recording has been captured, the inquiry is transmitted to the intended collaborator with the captured portion of recording in 320. In some example implementations, the inquiry may be sent to the intended collaborator by a variety of mechanisms including an email, an SMS message, an App-based notification, or any other type of notification that may be apparent to a person of ordinary skill in the art. In other example implementations, the inquiry may be placed in a queue of the intended collaborator to review at his or her convenience.

In some embodiments, the portion of the recording captured in 315 may be attached to the inquiry and transmitted to the intended collaborator. In other example embodiments, a link to download the portion of the recording captured in 315 may be attached to the inquiry. In still other example embodiments, a link (e.g., a flag or hyperlink discussed above) to jump to the start point of the portion of the recording may be attached to the inquiry and the intended collaborator can use the link to stream the video from the start point onward.

After the inquiry is sent, the intended collaborator may review the inquiry and prepare a reply to the inquiry. FIGS. 6A-6C and 7, discussed in greater detail below, illustrate example implementation of UIs 600-602, 700 that could be used by the intended collaborator to review the inquiry and the associated portion of the recording. FIG. 8, discussed in greater detail below, illustrates an example implementation of a UI that could be used by the intended collaborator to prepare a reply to the inquiry.

In 330, the system may receive the intended collaborator's reply to the inquiry. In some example implementations, the received reply may include a recording. The reply recording may be captured by any recording mechanism that may be apparent to a person of ordinary skill in the art. For example, web cameras, digital cameras, telepresence cameras or any other visual capture device apparent to a person of ordinary skill in the art could be used to record video or other visual data of the intended collaborator in some example embodiments. Further, in some example implementations, audio from the intended collaborator may be captured using computer microphones, digital voice recorders, smart phones, telephones, or any other audio capture device that could be apparent to a person of ordinary skill in the art.

In some example implementations, the system may optionally determine whether the received reply includes a new recording by the intended collaborator at 335. If the received reply is determined to contain a recording (YES—335), the received recording may be linked or incorporated into the recording of the meeting of the collaborators at 325 (discussed in greater detail below). If the reply does not contain a recording (NO—335) (e.g., the intended collaborator sends a written or text-based reply), the received reply may optionally be forwarded directly to the collaborators who generated the inquiry at 340 and the process 300 may end. The reply may be sent to collaborators by email, SMS message, App-based notification, or any other mechanism that may be apparent to a person of ordinary skill in the art.

Returning to receiving the reply at 330, in other example implementations, the system might not make any determination regarding the received reply, and may instead proceed to append or incorporate the received reply into the recording of the meeting at 325. For example, if an audio reply was received, the audio reply may be incorporated into the recording at a time point or interval immediately after the inquiry was generated (e.g., the reply to inquiry may be incorporated immediately after the inquiry was generated). As another example, a video reply may be incorporated into the recording at a time point immediately after the inquiry was generated.

If a text or written reply is received, the text reply may be incorporated into the recording by displaying the text or reply during playback of the recording of the meeting in some example implementations. In other example implementations, the text or written reply may be processed using text to speech algorithms to generate an audio reply and the audio reply may be incorporated into the recording.

In some example implementations, the received reply may be incorporated directly into the recording to produce a continuous recording. In other example implementations, the received reply may be incorporated as a hyperlink to cause the recording to branch and provide an option to either view the reply recording, or proceed with the meeting without reviewing the reply.

The process 300 may end after the reply is appended or incorporated into the recording at 325 in some example implementations. In other example implementations, a notification may optionally be sent to collaborators, who attended the meeting to inform them that a reply has been received at 345. The notification may be sent to the collaborators by email, SMS message, app-based notification, or any other mechanism that may be apparent to a person of ordinary skill in the art. After the notification has been sent, the process 300 may end.

Figure 4:
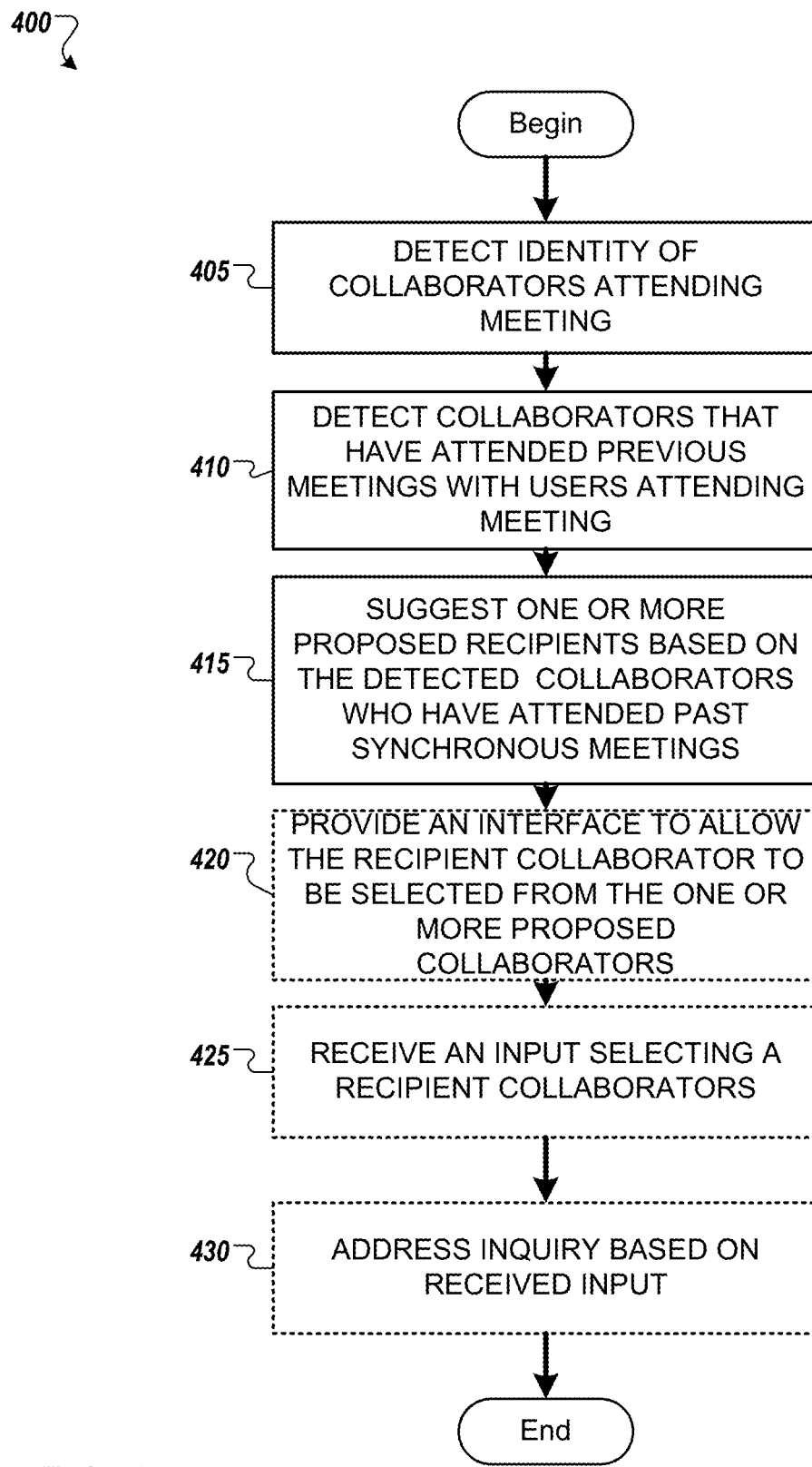
FIG. 4 illustrates a flowchart of a process for addressing an inquiry during the process of FIG. 3.

FIG. 4 illustrates a flowchart of a process 400 for addressing an inquiry during the process 300 illustrated in FIG. 3. The process 400 for addressing an inquiry may be performed by a remote meeting system (e.g., a stand-along synchronous meeting system, a computing device running synchronous meeting software) according to an example implementation of the present application based on input from collaborators attending a meeting. The process 400 may be performed during generating an inquiry (e.g., operation 310 of process 300 of FIG. 3 discussed above) of a process for sending inquiries.

In the process 400, the identity of collaborators attending the current meeting may be detected at 405. In some example implementations, the identity of collaborators may be detected by audio or video recordings being captured (with user permission) of the current meeting by recording devices (e.g., web cameras, digital cameras, telepresence cameras, computer microphones, digital voice recorders, smart phones, telephones, or any other visual or audio capture device apparent to a person of ordinary skill in the art). In other example implementations, the identity of the collaborators may be detected (with user permission) based on log-in credentials used by the collaborators to log into the remote meeting system (e.g., a user name/password combination, a biometric credential, or any type of credential that may be apparent to a person of ordinary skill in the art).

Based on the detected identity of collaborators attending the current meeting, the system may detect collaborators who have previously attended meetings with the collaborators attending the current meeting at 410. In some example implementations, the detection in 410 may be based on stored attendance records from the previous meetings. For example, when generating an inquiry, collaborators who have been in previous meetings with the currently attending collaborators might be considered the candidates for receiving inquiries.

In some example implementations, the total attendance time of each collaborator may be calculated of each previous meeting. For each collaborator attending the current meeting, the sum of attendance time of that collaborator and every other collaborator who attended previous meetings attended in common may be calculated. The sum of attendance time for each pair of collaborators is twice their average attendance time. Thus, the average attendance time could be used in other example embodiments.

The computation of the sum of attendance time of each attending collaborator may be used to produce an ordered list of descending attendance time of other previous attendees. This ordered list could be used to suggest one or more proposed recipient collaborators at 415 for receiving the inquiry being generated.

For example, people at the head of the list might be considered the best candidates for receiving an inquiry. Attendance in earlier meetings related to the current meeting may be included in the calculation to make sure that those earlier meeting attendees will be included in the list. Attendees of the current meeting may be omitted in some example implementations because an inquiry might not be sent to a collaborator present at the current meeting. However, in some example implementations, a currently attending collaborator may want to send an inquiry to himself or herself with notes to follow-up on an issue after the meeting.

To illustrate the calculations used to prepare the ordered list and make the suggestions at 415, the following example might be considered. Alice and Bob attend current meeting H3. Alice has attended the current meeting H3 for a total of 25 minutes and Bob has attended for 22 minutes. In a previous meeting H1, Alice attended for a total of 20 minutes and Bob has attended for a total of 10 minutes. In another previous meeting H2, Bob attended for a total of 15 minutes. Charlie attended meeting H1 for 12 minutes and meeting H2 for 18 minutes. Dan attended meeting H2 for 5 minutes. Dan also attended earlier meetings related to the current meeting H3 for 13 minutes. Ernest attended H1 for 8 minutes.

Based on this information, the following pairwise totals are calculated (pair Alice+Bob may be ignored in this example because both Alice and Bob are already attending the current meeting):

TABLE 1

PAST MEETING ATTENDANCE TIME (MINUTES)

| Absent Collaborator | Meetings with Alice | Meetings with Bob | Total (Alice + Bob) |
|---|---|---|---|
| Charlie | 32 (H1: 12 + 20) | 55 (H1: 12 + 10; H2: 18 + 15) | 87 |
| Dan | 38 (H1: 25 + 13) | 55 (H2: 5 + 15; H3: 13 + 22) | 93 |
| Ernest | 28 (H1: 8 + 20) | 18 (H1: 8 + 10) | 46 |

As Table 1 indicates that Dan has the most amount of minutes at meetings with either Alice or Bob, he thus may be suggested as a potential inquiry recipient at 415. This calculation represents only one possible example implementation for looking at past attendance data to determine the potential candidates for receiving inquiries. Another example implementation may collapse the attendees of the current meeting to de-emphasize candidates who attended previous together with multiple attendees of the current meeting. Other modifications may be apparent to a person of ordinary skill in the art.

After the system suggests proposed recipients, the system may automatically insert the proposed recipient in the inquiry as the intended collaborator in some example implementations and the process 400 may end. When process 400 ends, the process 300 of FIG. 3 may proceed to 315 discussed above.

In other example implementations, the system may optionally provide a UI to allow the collaborator generating the inquiry to select the intended collaborator from a list of proposed recipients at 420. The system may then optionally receive an input via the UI at 425 selecting an intended collaborator from the list. The UI 500 illustrated in FIG. 5 may be used to select the intended collaborator. Use of the UI 500 of FIG. 5 to generate the inquiry is discussed in greater detail below. In response to the received input, the system may address the generated inquiry to the selected intended collaborator at 430 and process 400 may end. When process 400 ends, the process 300 of FIG. 3 may proceed to 315 discussed above.

FIG. 5 illustrates an example implementation of a UI 500 usable in one or more processes. For example, the UI 500 may be used to generate an inquiry, address the inquiry, and determine start and end points to capture a portion of a recording to attach to the inquiry as discussed above with respect to FIGS. 3 and 4. As illustrated, the UI 500 illustrates inquiry being generated in the context of a video-recorded meeting involving review of video recordings from previous meetings. The UI 500 may include windows 505, 510 of live video feeds of the attendees of the current meeting. The UI 500 may also include windows 515, 520, 525 representative of individual collaborator recording feeds from a previous meeting being reviewed during the current meeting. The UI 500 may also include a timer bar 530 representative of the recordings of the current meeting and a timer bar 535 representative of the video recordings of the previous meeting being reviewed during the current meeting. The attendees of the current meeting may review the prior meeting and create hyperlinks from the video recordings of those meetings to the recording of the current meeting.

During the current meeting, one of the attendees may select an object such as a button 540 to create an inquiry to send to a collaborator not present at the current meeting. The button 540 may cause a pop-up screen 545 that will be used to generate the inquiry. The pop-up screen 545 may include an area 550 where the attendee can select an intended collaborator to receive the inquiry from a plurality of suggested collaborators (e.g., the suggested collaborators discussed above with respect to the process 400 of FIG. 4). In some example implementations, the intended collaborator to receive the inquiry may manually be entered into the area 550. The pop-up screen 545 may also include a text box 555 for the attendee to write a brief description for the inquiry. The UI 500 may also include a timer bar 560 that could be used to select or move suggested start and stop points for a portion of the recording to be captured and included with the inquiry.

The pop-up screen 545 may also include an object such as a button 565 to submit the inquiry and an object such as a button 570 to cancel the inquiry and return to the current meeting. When the button 565 is selected, the inquiry may be immediately sent to the intended collaborator in some example implementations. In other example implementations, the inquiry may be sent after the current meeting has ended and the recording of the meeting has been encoded to the system.

Figures 6A, 6B, 6C:
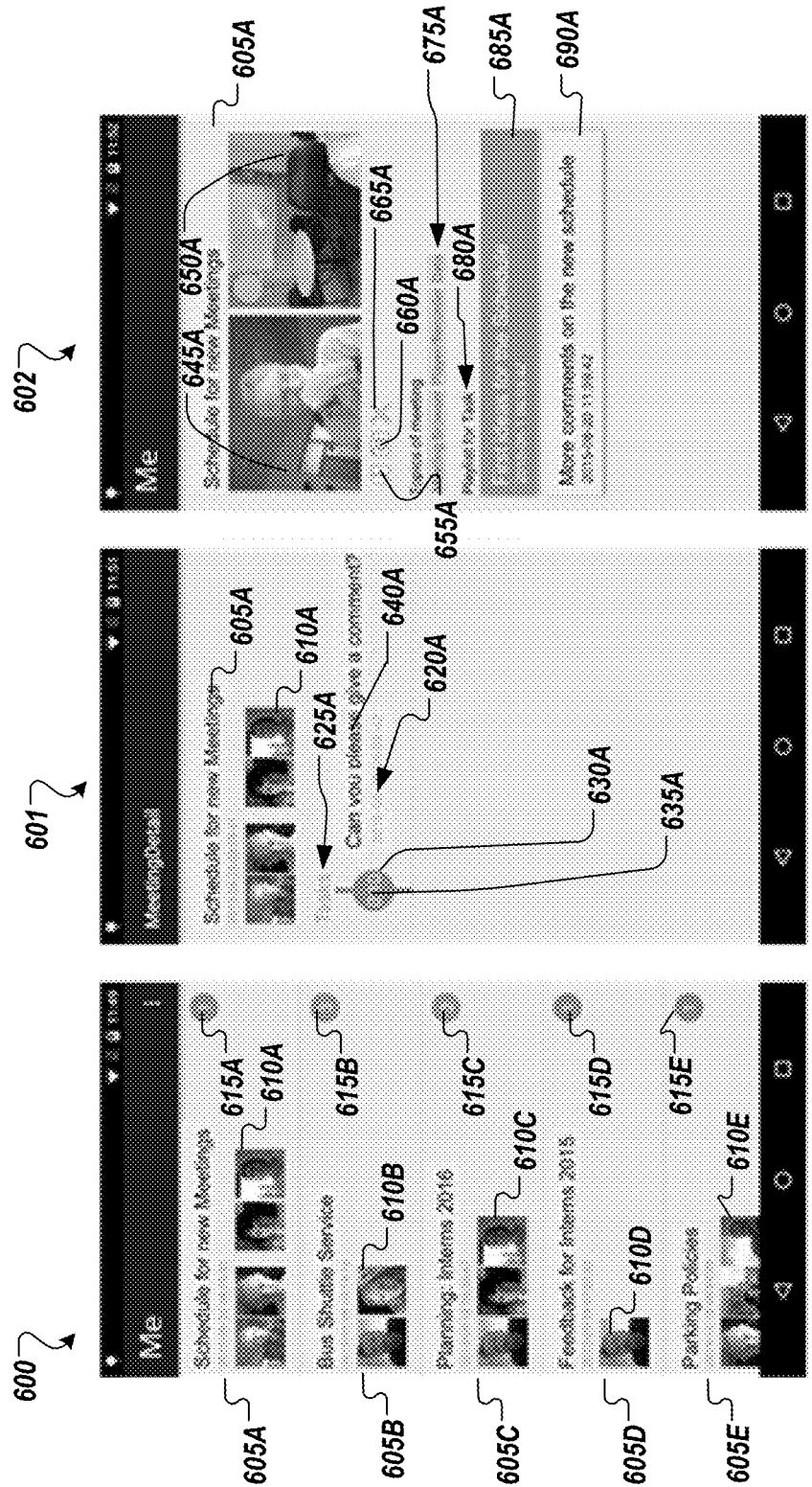
FIGS. 6A-6C illustrate example UIs usable to review an inquiry and the associated portion of a recording according to an example implementation of the present application.

FIGS. 6A-6C illustrate example UIs 600-602 usable to review an inquiry and the associated portion of a recording according to an example implementation of the present application. The UI 600 may be considered a UI for use on a mobile computing device (e.g., a portable media player, tablet, mobile phone, etc.) and may provide a simplified interface. As an example of using the UI 600, the collaborator may receive a notification that a new inquiry has been sent to him or her or has been placed in the collaborator's queue for review. Such notification may be an email, SMS message, an App-based notification, or any other type of notification that may be apparent to a person of ordinary skill in the art.

By selecting the notification or link provided in the notification, the collaborator may be taken to an App display interface (e.g., the UI 600 illustrated in FIG. 6A). The interface 600 illustrated in FIG. 6A may provide the collaborator with an overview of ongoing inquiry entries 605A-605E waiting for reply in a list. As illustrated, the UI 600 may show active and not yet answered requests as a list, grouped by meeting. Each entry 605A-605E may contain the name of the meeting chain (e.g., "Schedule for New Meetings", "Bus Shuttle Service", "Planning: Interns 2016", "Feedback for Interns 2015", "Parking Policies") and the date of the last meeting related to this chain. In some example implementations, the UI 600 may also include profile pictures 610A-610E of all collaborators involved in the meeting chain. Further, on the right side of the screen of the UI 600, each entry 605A-605E may include a number 615A-615E, representative of how many requests are currently received and active, related to the meeting chain.

By selecting one of the entries (e.g., 605A-"Schedule for New Meetings"), the UI 600 from FIG. 6A may transition to UI 601 of FIG. 6B to show detailed information for this meeting chain including related requests 620A. The detailed information could include the name of the meeting chain, date of the last meeting and profile photos (with user permission) of the involved users. The UI 601 shows a list 625A of active requests 620A. In FIG. 6B, only one active inquiry 620A is illustrated in the list 625A. However, in other example implementations, multiple active inquiries may be illustrated in the list 625A. Each information request 625A may be represented by a circle 630A. Within the circle 630A, an overall duration 635A of recorded material attached to the inquiry 620A may be displayed in some example implementations. Additionally, in some example implementations, the size of the circle 630A may represent the duration of the recorded material (e.g., the bigger the circle, the longer duration of the attached recorded material). Further, in some example embodiments, each entry 605A may also contain a short description 640A of the inquiry as well as the date and time of creation of the request.

By selecting one of the active inquiries (e.g., 620A), the UI 601 from FIG. 6B may transition to UI 602 to allow the collaborator to review the attached recorded material attached to the inquiry 620A. In some example implementations, the inquiry 620A may contain recorded material from multiple past meetings 645A, 650A. In such example implementations, the record material may be linked or spliced together to allow playback in a planned manner automatically (e.g., the oldest meeting recording being played first, each subsequent meeting recordings being played chronologically), each recording following a preceding recording. In some example implementations, the sequencing may be done automatically by the system or manually by the collaborator when generating the inquiry during the process 300 of FIG. 3.

In some example implementations, each collaborator attending the meeting may have her or his own recording and each recording may be displayed during playback. The collaborator reviewing the inquiry can start or pause the recording playback using a button 655A provided on the UI 602. By selecting a camera button 660A, the collaborator reviewing the inquiry can start a new recording to record a reply message as feedback for the inquiry (discussed in greater detail below with respect to FIG. 8). The UI 602 may also provide an object such as a button 665A that may dismisses the inquiry without a reply.

Further the UI 602 may also include a list of topics 670 created within the meeting chain. This list of topics 670 may provide additional contextual information and help to the collaborator to understand the current topic of the meeting he or she is receiving an inquiry regarding. To enable the user to navigate between recording portions from different meetings, the UI 602 may provide a playlist 680A of different segments 685A, 690A of recording material. Each entry 605A may provide the name of the meeting that the material has been extracted from, as well as the date of the meeting. By selecting the segments 685A, 690A of the playlist 680A, the collaborator may be able to switch between recording portions and review them.

Figure 7:
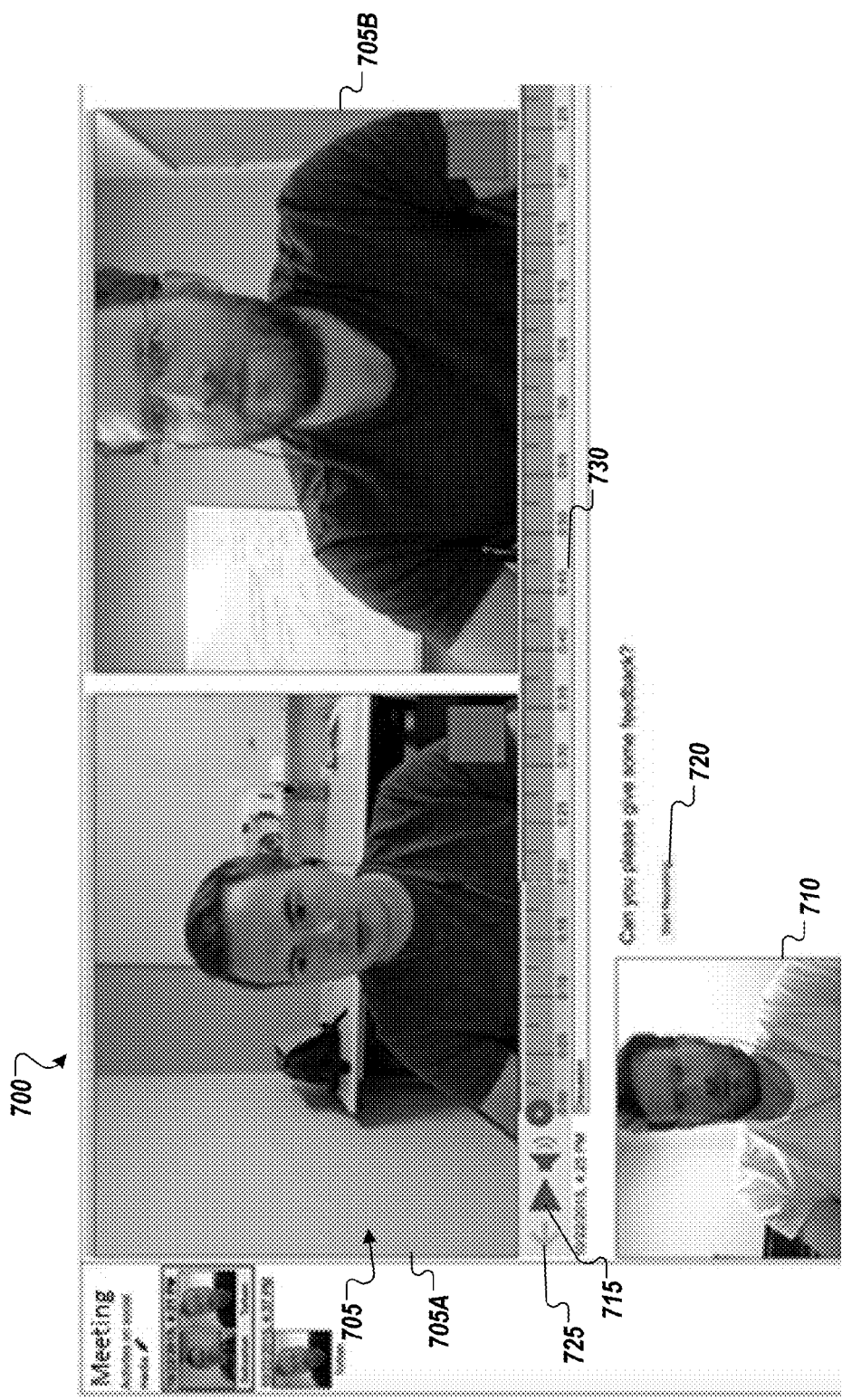
FIG. 7 illustrates an example of a UI usable to review an inquiry and the associated portion of a recording according to another example implementation of the present application.
Figure 8:
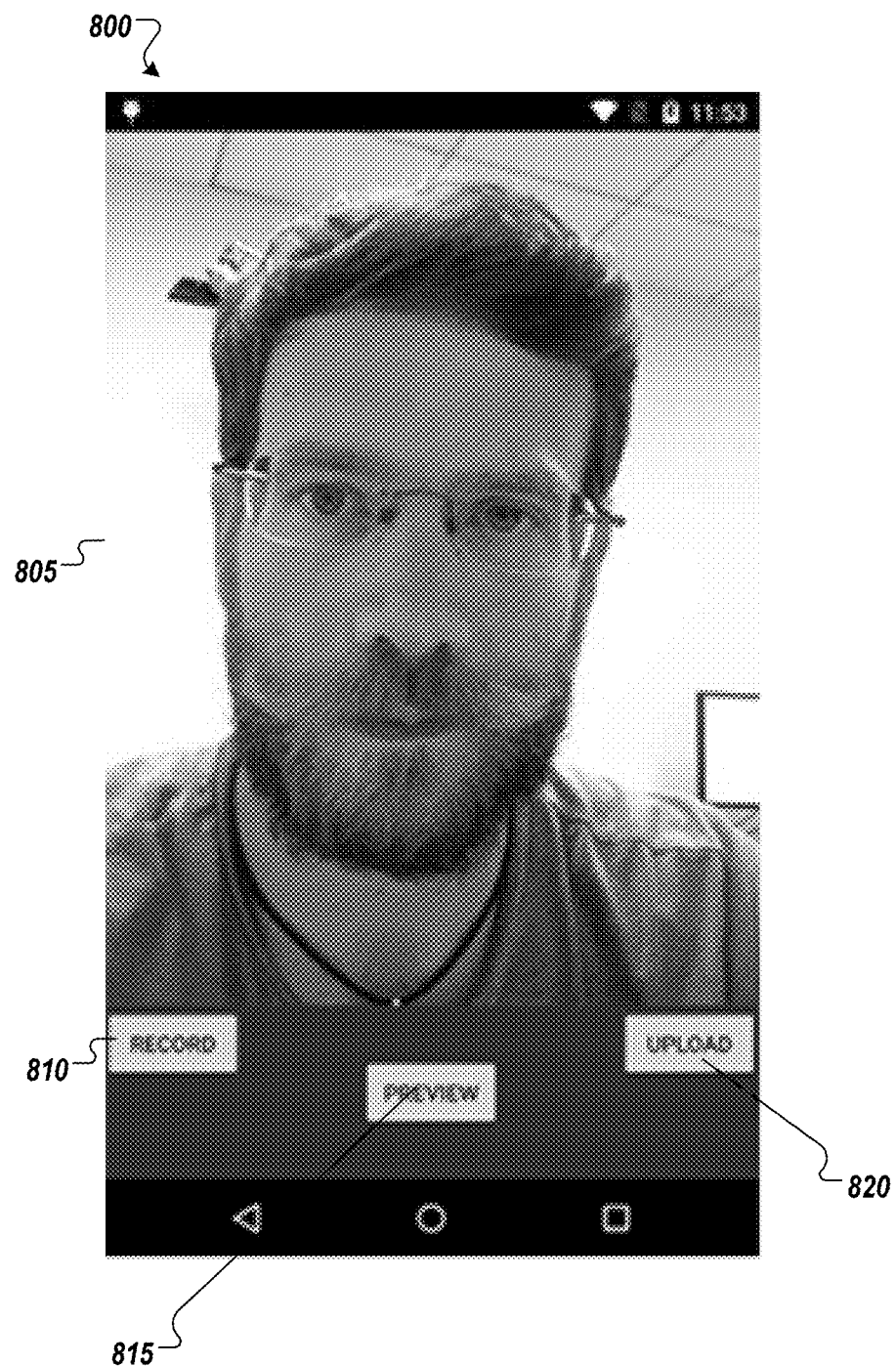
FIG. 8 illustrates an example of a UI usable to prepare a reply to an inquiry according to an example implementation of the present application.

FIG. 7 illustrates an example of a UI 700 usable to review an inquiry and the associated portions of a recording according to other example implementations of the present application. The UI 700 may be configured for review of the inquiry and playback of the associated recordings on a computing device (e.g., a laptop, desktop, or terminal) through a web-based portal. The UI 700 may include separate recording areas 705, 710 representative of different recorded material. In some example implementations, the separate recording areas 705, 710 may include recorded material from different past meetings. In such example implementations, the record material may be linked or spliced together to allow playback in a planned manner automatically (e.g., the oldest meeting recording is played first, each subsequent meeting recordings placed chronologically), each recording following a preceding recording. In some example implementations, the sequencing may be done automatically by the system or manually by the collaborator when generating the inquiry during the process 300 of FIG. 3.

In some example implementations, each collaborator attending a previous meeting may have her or his own recording and each recording may be displayed during playback in the separate recording windows 705A, 705B in the recording area 705. The collaborator reviewing the inquiry can start or pause the recording playback using a button 715 provided on the UI 700. By selecting a recording button 720, the collaborator reviewing the inquiry can start a new recording to record a reply message as feedback for the inquiry (discussed in greater detail below with respect to FIG. 8). The UI 700 may also provide a button 725 that may dismisses the inquiry without a reply.

The 700 may also include a timeline 730 to allow the collaborator to change the player's current position of playback. This may allow reviewing smaller parts within one recording if, for example, the collaborator missed an important part of the conversation. By selecting a specific position of the timeline 730, the collaborator can change the current playback position. In some example implementations, the timeline 730 of the playback may include all attached recording portions (e.g., all previous meetings attached to the inquiry). In such example implementations, the user may also change the current playback to the next video material of subsequent meeting.

FIG. 8 illustrates an example of a UI 800 usable to prepare a reply to an inquiry according to example implementations of the present application. The UI 800 may include a recording view window 805 representative of the recording of the collaborator during recording. For example, if a video recording is being captured, the recording view window 805 may be a camera preview of the image to be captured. In other example implementations, the recording view window 805 may include a timer or counter indicative of the recording time or duration.

The UI 800 may also include a button 810 to begin recording of a reply. When the button 810 is activated, the system may begin recording the reply. The recording may be done by any recording mechanism associated with the system that may be apparent to a person of ordinary skill in the art. For example, web cameras, digital cameras, telepresence cameras or any other visual capture device apparent to a person of ordinary skill in the art could be used to record video or other visual date of the remotely located collaborators during meeting in some example embodiments. Further, in some example implementations, audio from each of the remote collaborators may be captured using computer microphones, digital voice recorders, smart phones, telephones, or any other audio capture device that could be apparent to a person of ordinary skill in the art.

The UI 800 may also include a button 815 to allow the collaborator to preview or review a recorded reply prior to sending the reply back to the system. By activating the button 815, the recording may be played back using the recording view window 805 and/or another playback device associated with the system.

The UI 800 may also include a button 820 to allow the collaborator to upload the recorded reply back to the system. When the button 820 is activated, the recorded reply is transmitted back to the system and the system may proceed with appending the recorded reply into the recording of the meeting during which the inquiry was generated.

Evaluation

Figure 9:
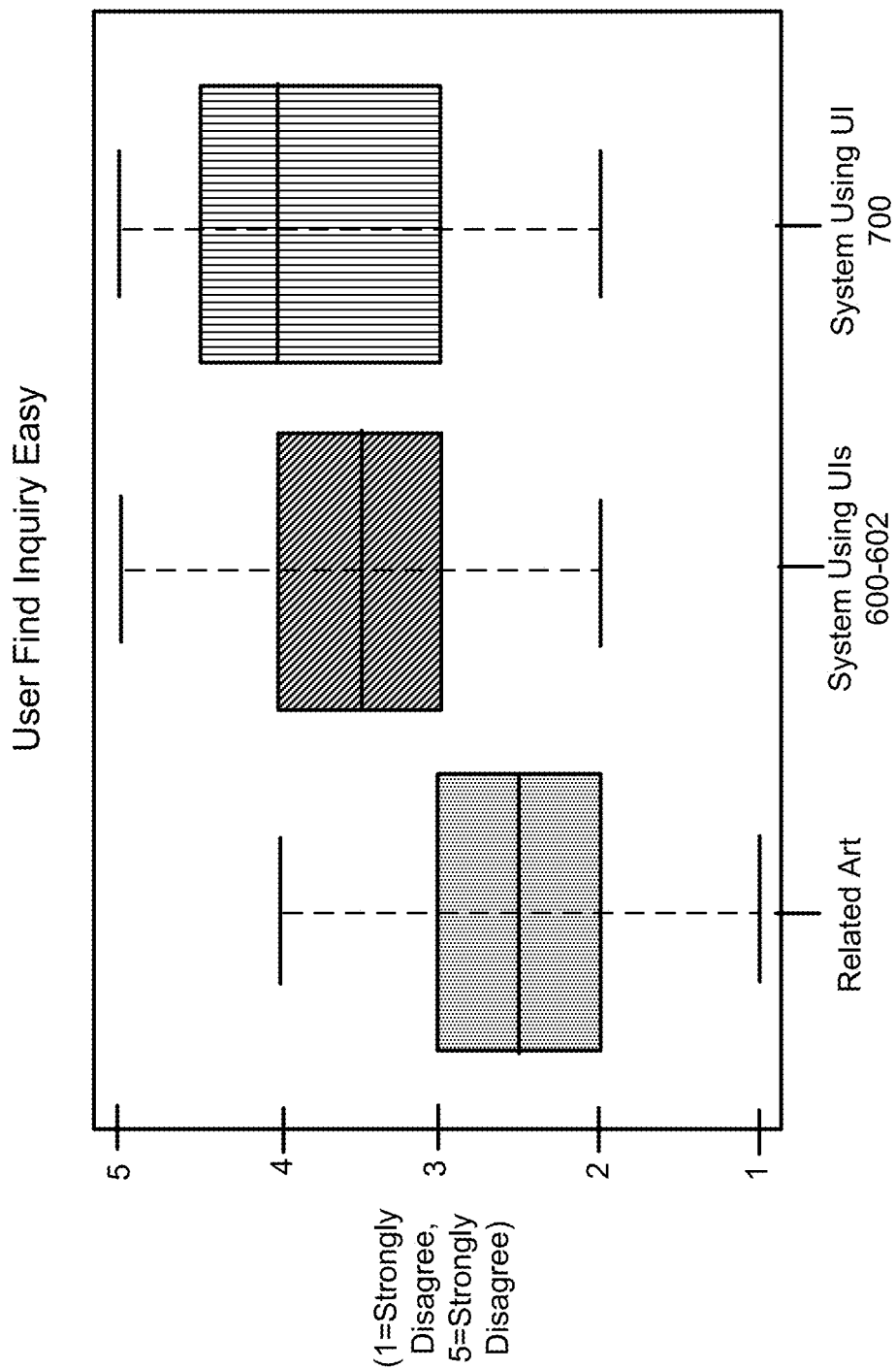
FIG. 9 illustrates a comparison of usability of various remote meeting systems including example implementations of the present application.

FIG. 9 illustrates a comparison of usability of various remote meeting systems including example implementations of the present application. A lab evaluation of three systems (a related art system, a system using the UIs 600-602 of FIGS. 6A-6C, and a system using the UI 700 of FIG. 7) was conducted using a user survey. The survey examined if users find it easier to find and receive inquiries from past meetings using the system with users assigning a score of 1-5 (1=strongly disagree Easy, 5=Strongly Agree Easy; Y-Axis of FIG. 9). The evaluation compared the different design solutions (along the X-axis) for reviewing contextual recording portions. Users were also surveyed on whether they perceive the system as being suitable for a mobile use context.

The three different systems were compared based on prepared inquiries, review of the contextual information, and reaction to the inquiry by giving feedback via a recorded message. Participants used all three systems in a randomized order. Following each usage, participants were asked to rate the system using a questionnaire. The results were graphed in FIG. 9 with the boxed regions representing suitability for use for a mobile use context and the outlying lines representing the ease of use for each system.

As FIG. 9 illustrates, participants perceived the related art systems, which lack support for receiving and responding to inquiries with contextual recording portions, were more difficult to use and further perceived the related art system as more complicated to learn how to use. Finding an inquiry was perceived as easier using either a system using the UIs 600-602 of FIGS. 6A-6C and a system using the UI 700 of FIG. 7 compared to the related art system. Further, users perceived a system using the UIs 600-602 of FIGS. 6A-6C was more usable in mobile device implementations compared to systems using the UI 700 of FIG. 7.

Example Environment

Figure 10:
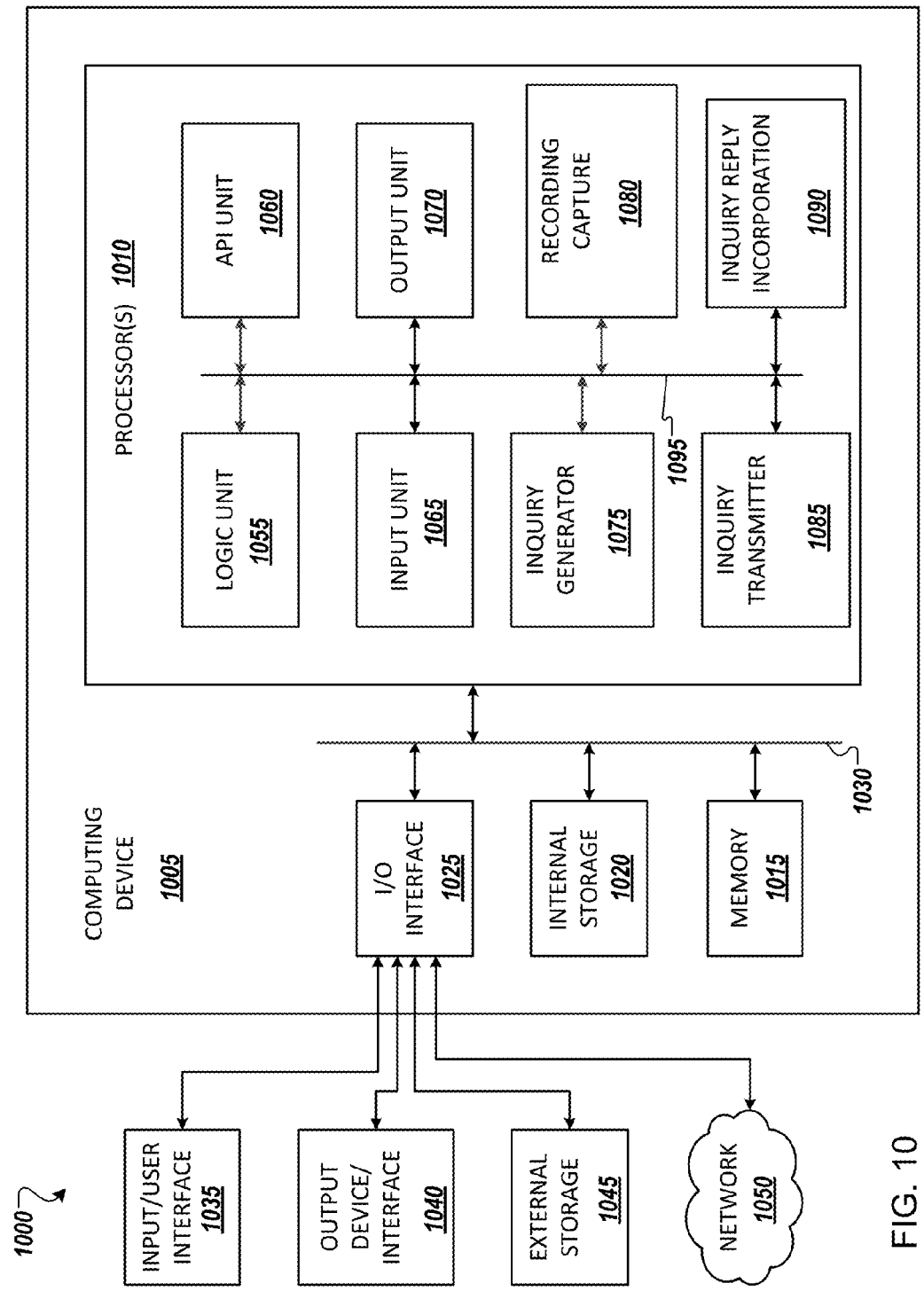
FIG. 10 illustrates an example computing environment with an example computer device suitable for use in some example implementations.

FIG. 10 illustrates an example computing environment 1000 that could be used for remote synchronous meeting with an example computing device 1005 suitable for use in some example implementations. Computing device 1005 in computing environment 1000 can include one or more processing units, cores, or processors 1010, memory 1015

(e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1055, application programming interface (API) unit 1060, input unit 1065, output unit 1070, inquiry generator 1075, recording capture unit 1080, inquiry transmitter unit 1085, inquiry reply incorporation unit 1090, and inter-unit communication mechanism 1095 for the different units to communicate with each other, with the OS, and with other applications (not shown). For example, inquiry generator 1075, reference data collector unit 1080, inquiry transmitter unit 1085, and inquiry reply incorporation unit 1090 may implement one or more processes shown in FIGS. 3-4. The described units and elements can be varied in design, function, configuration, or implementation and are not limited to the descriptions provided.

In some example implementations, when information or an execution instruction is received by API unit 1060, it may be communicated to one or more other units (e.g., logic unit 1055, input unit 1065, output unit 1070, inquiry generator 1075, recording capture unit 1080, inquiry transmitter unit 1085, and inquiry reply incorporation unit 1090). For example, when an input from a collaborator attending a meeting is received via the input unit 1065, the inquiry generator 1075 may generate an inquiry and the recording capture unit 1080 may capture a portion of a recording to be attached to the generated inquiry. Additionally, after the recording capture unit 1080 captures the portion of the recording, and the inquiry generator 1075 generates the inquiry, the inquiry transmitter unit 1085 may transmit the inquiry and the captured portion of the recording to an absent collaborator using the output unit 1070. Further, when the absent collaborator sends a reply, the reply may be received by the inquiry reply incorporation unit 1090 and may be incorporated, linked, inserted, or appended into the recording.

In some instances, the logic unit 1055 may be configured to control the information flow among the units and direct the services provided by API unit 1060, input unit 1065, output unit 1070, inquiry generator 1075, recording capture unit 1080, inquiry transmitter unit 1085, and inquiry reply incorporation unit 1090 in some example implementations described above. For example, the flow of one or more processes or implementations may be controlled by logic unit 1055 alone or in conjunction with API unit 1060.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

We claim:

1. A method of requesting an inquiry reply during a synchronous remote meeting, the method comprising:

recording a synchronous meeting between remote users to generate a meeting recording;

receiving a request to generate an inquiry during the synchronous meeting;

generating an inquiry during the synchronous meeting to create a generated inquiry to be sent to a recipient user absent from the synchronous meeting;

identifying a portion of the meeting recording relevant to the inquiry, the portion of the meeting recording occurring prior to the received request to generate an inquiry; and transmitting the generated inquiry and the captured portion of the recording to the recipient user.

2. The method of claim 1, further comprising receiving an asynchronous reply to the transmitted inquiry, the reply comprising a recording responsive to the transmitted inquiry.

3. The method of claim 2, further comprising:
storing the meeting recording for subsequent viewing;
inserting the recording responsive to the transmitted inquiry into the stored meeting recording,
wherein the recording responsive to the transmitted inquiry is inserted at a time interval of the meeting recording adjacent a time interval corresponding to the generating the inquiry.

4. The method of claim 1, wherein the capturing the portion of the recording relevant to the transmitted inquiry comprises one or more of:
detecting a change source of user input during the synchronous meeting;
detecting silence in the meeting indicative of sentence boundaries during the synchronous meeting; and
detecting a topic change during the synchronous meeting.

5. The method of claim 4, further comprising providing a user interface to allow a duration adjustment of the portion of the meeting recording.

6. The method of claim 1, wherein the generating the inquiry comprises:
detecting the identity of the remote users;
detecting users, who have attended past synchronous meetings also attended by the remote users;
suggesting one or more proposed recipients based on the detected remote users who have attended past synchronous meetings; and
providing an interface to allow the recipient user to be selected from the one or more proposed recipients.

7. The method of claim 1, wherein the transmitting the generated inquiry and the captured portion of the recording to a recipient user comprises sending at least one of:
an email,
an SMS message, and
a mobile app-based notification.

8. A non-transitory computer readable medium having stored therein a program for making a computer execute a method of requesting an inquiry reply during a synchronous remote meeting, the method comprising:
recording a synchronous meeting between remote users to generate a meeting recording;
receiving a request to generate an inquiry during the synchronous meeting;
generating an inquiry during the synchronous meeting to create a generated inquiry to be sent to a recipient user absent from the synchronous meeting;
identifying a portion of the meeting recording relevant to the inquiry, the portion of the meeting recording occurring prior to the received request to generate an inquiry; and
transmitting the generated inquiry and the captured portion of the recording to the recipient user.

9. The non-transitory computer readable medium of claim 8, further comprising receiving an asynchronous reply to the transmitted inquiry, the reply comprising a recording responsive to the transmitted inquiry.

10. The non-transitory computer readable medium of claim 9, further comprising:
storing the meeting recording for subsequent viewing;
inserting the recording responsive to the transmitted inquiry into the meeting recording,
wherein the recording responsive to the transmitted inquiry is inserted at a time interval of the meeting recording adjacent a time interval corresponding to the generating the inquiry.

11. The non-transitory computer readable medium of claim 8, wherein the capturing the portion of the recording relevant to the transmitted inquiry comprises one or more of:
detecting a change in source of user input during the synchronous meeting;
detecting silence in the meeting indicative of sentence boundaries during the synchronous meeting; and
detecting a topic change during the synchronous meeting.

12. The non-transitory computer readable medium of claim 11, further comprising providing a user interface to allow a duration adjustment of the portion of the meeting recording.

13. The non-transitory computer readable medium of claim 8, wherein the generating the inquiry comprises:
detecting the identity of the remote users;
detecting users who have attended past synchronous meetings also attended by the remote users;
suggesting one or more proposed recipients based on the detected remote users who have attended past synchronous meetings; and
providing an interface to allow the recipient user to be selected from the one or more proposed recipients.

14. The non-transitory computer readable medium of claim 8, wherein the transmitting the generated inquiry and the captured portion of the recording to a recipient user comprises sending at least one of:
an email,
an SMS message, and
a mobile app-based notification.

15. A server apparatus configured to request an inquiry reply during a synchronous remote meeting, the server apparatus comprising:
a memory; and
a processor configured to:
record a synchronous meeting between remote users to generate a meeting recording;
receive a request to generate an inquiry during the synchronous meeting;
generate an inquiry during the synchronous meeting to create a generated inquiry to be sent to a recipient user absent from the synchronous meeting;
identify a portion of the meeting recording relevant to the inquiry, the portion of the meeting recording occurring prior to the received request to generate an inquiry; and
transmit the generated inquiry and the captured portion of the recording to the recipient user.

16. The server apparatus of claim 15, wherein the processor is further configured to receive an asynchronous reply to the transmitted inquiry, the reply comprising a recording responsive to the transmitted inquiry.

17. The server apparatus of claim 16, wherein the processor is further configured to:
store the meeting recording to the memory for subsequent viewing;

inserting the recording responsive to the transmitted inquiry into the meeting recording, wherein the recording responsive to the transmitted inquiry is inserted at a time interval of the meeting recording meeting adjacent a time interval corresponding to the generating the inquiry.

18. The server apparatus of claim 15, wherein the processor is configured to capture the portion of the recording relevant to the transmitted inquiry by doing one or more of:

detecting a change in source of user input during the synchronous meeting;

detecting silence in the meeting indicative of sentence boundaries during the synchronous meeting; and detecting a topic change during the synchronous meeting.

19. The server apparatus of claim 15, wherein processor is configured to generate the inquiry by:

detecting the identity of the remote users;

detecting users who have attended past synchronous meetings also attended by the remote users;

suggesting one or more proposed recipients based on the detected remote users who have attended past synchronous meetings; and providing an interface to allow the recipient user to be selected from the one or more proposed recipients.

20. The server apparatus of claim 15, wherein processor is configured to transmit the generated inquiry and the captured portion of the recording to a recipient user by sending at least one of:

an email, an SMS message, and a mobile app-based notification.

\* \* \* \* \*